June 1, 1965
V. L. FALOTICO
3,186,007
SELECTIVELY OPERATED STACKED COLUMNS FOR CONTROLLING
AMOUNT OF DISCHARGE FROM FLUSH TANK
Filed March 4, 1963
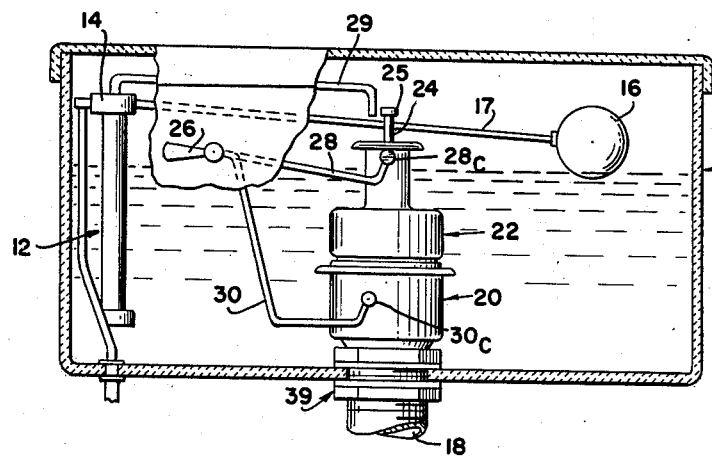
FIG. 1
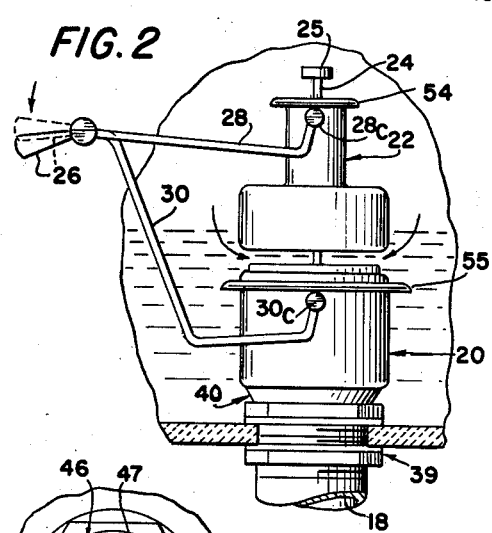
FIG. 2
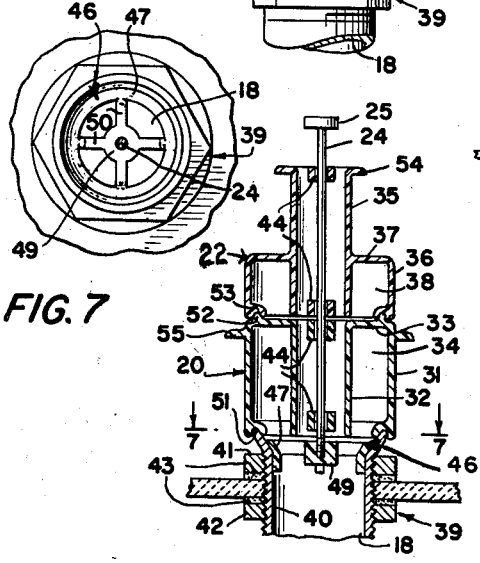
FIG. 7
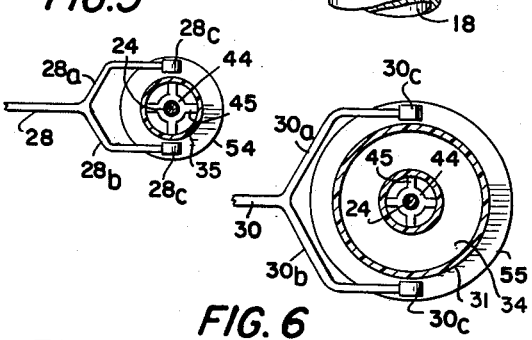
FIG. 3
FIG. 5
FIG. 4
FIG. 6
INVENTOR.
VINCENT L. FALOTICO
BY
Brumbaugh, Free, Graves & Donohue
ATTORNEYS > # United States Patent Office > 3,186,007
> Patented June 1, 1965

3,186,007
SELECTIVELY OPERATED STACKED COLUMNS FOR CONTROLLING AMOUNT OF DISCHARGE FROM FLUSH TANK
Vincent L. Falotico, 309 Felter Ave., Woodmere, N.Y.
Filed Mar. 4, 1963, Ser. No. 262,503
6 Claims. (Cl. 4—37)

This invention relates to a novel water closet wherein at least two different quantities of water can be selectively discharged from the tank depending on waste material to be flushed.

Water closets now in general use discharge the entire amount of water stored in the tank upon each operation even though the quantity of water required for flushing waste material of different character varies. This results in unnecessary water consumption, increased water costs, and present special problems where the water is flushed into a cesspool or septic tank. In many places there is a critical shortage of water; in fact, the number of regions faced with water shortage problems is constantly increasing. In addition, many municipal waste disposal systems are already over-burdened with the increasing quantities that flow through sewer systems and treatment plants. Therefore, this invention fills a present and ever growing need.

While a number of water-saving water closets have been heretofore proposed, they have been unacceptable for various reasons, principally because they embody complicated, expensive, and impractical structures. For example, one type of water closet heretofore proposed includes a partitioned tank, separate water-discharging devices and duplication of plumbing for discharging water from one or both parts of the partitioned tank. As a consequence, these previously suggested water closets designed for the discharge of different, predetermined quantities of water have been impractical, expensive and have not met with commercial success.

The present invention relates to a novel water-saving water closet in which the discharge of water from the tank is controlled by two columns, on above the other in end-to-end relationship. The lower of the two columns surrounds the discharge opening in the tank and is capable of sealing a quantity of water in the tank to the height of the lower column, and the upper column, when in end-to-end sealing engagement with the lower column, is capable of sealing an additional quantity of water within the tank to a level equal to the combined heights of the columns. When it is desired to discharge a limited quantity of water from the storage tank, the upper column is lifted out of sealing engagement with the lower column, and the water is discharged from the tank until the upper column is restored to sealing engagement with the lower column; however with the lower column still in place, the water level cannot fall below the level of the upper end of the lower column. If, on the other hand, it is desired to discharge a greater or the entire amount of water stored in the tank for flushing purposes, both columns are raised away from the discharge opening in the tank.

Ancillary features of the novel water closet of the present invention include provision for guiding both columns for vertical movement on the same axis and in alignment with the discharge opening of the tank, the elimination of the need for a separate overflow pipe required in conventional water closets, the provision of air entrapping flanges on the columns to permit them to float back to sealing position after operation, and a novel actuating device including a lost motion connection for lifting the upper of the two columns for partial discharge of the tank or both columns for a greater or complete discharge of the tank.

For a better understanding of the invention, reference may be had to the following detailed description of an exemplary embodiment of a variable flow water closet, taken in conjunction with the figures of the accompanying drawings, in which:

FIG. 1 is a view in elevation of the water closet of the present invention with part of the front wall of the tank broken away to reveal the movable columns, the column actuating mechanism, and the water supply apparatus;

FIG. 2 is a fragmentary view in elevation showing the upper column member lifted by partial movement of the actuating lever for discharge of a portion of the contents of the tank;

FIG. 3 is a fragmentary view in elevation showing both columns raised upon further movement of the actuating lever, thereby affording maximum discharge of the tank;

FIG. 4 is a view in section taken approximately along the vertical centers of the columns illustrated in FIGS. 1 to 3;

FIG. 5 is a bottom view of one of the columns taken approximately along the line 5—5 of FIG. 3 looking in the direction of the arrows;

FIG. 6 is a bottom view of the other of the columns taken approximately along the line 6—6 of FIGURE 3 looking in the direction of the arrows, and FIG. 7 is a top view of the discharge opening of the tank taken generally along the line 7—7 of FIG. 4 looking in the direction of the arrows.

Referring to FIG. 1, the water closet includes a tank 10 having mounted therein a water supply system 12 controlled by a conventional valve 14 controlled by a float 16 connected to the valve by a rod 17. The float-controlled valve admits water to the tank when the float drops below a certain level and turns off the water when the float rises to a predetermined level in the tank. Located in the bottom of the tank 10 is a discharge port which communicates through a conduit 18 with the bowl (not shown) to be flushed. A lower column 20 and an upper column 22, described in greater detail below, but each having a flow passage therethrough, are arranged for vertical movement on a guide rod 24 which extends upwardly in the tank from the discharge port. An enlarged head 25 at the upper end of the rod provides a stop for the upper column to retain it on the rod. The columns 20 and 22 are actuated by a handle 26 pivotally mounted on the front wall of the tank 10 through laterally projecting arms 28 and 30 connected to the handle. A conduit 29 connects the discharge side of the valve 14 with the flow passage through the upper end of the column 22 so that sealing water will be supplied to the bowl while the tank 10 is filling.

As shown in FIG. 4, the lower column 20 has a cylindrical outer wall 31 and a downwardly depending inner wall or flange 32 joined to the top of the outer wall 31 by an annular upper wall 33. These walls 31, 32 and 33 cooperate to define an annular space 34 in which air is trapped. The upper column 22 includes a tubular wall 35 aligned with the inner wall 32 of the lower column and extending almost the entire length of the upper column, a cylindrical wall 36 surrounding the lower end of the tubular wall 35 and aligned with the outer wall 31 of the lower column, and an annular wall 37 connecting the upper end of the wall 36 with the outer surface of the wall 35. The lower end of the wall 35 and the walls 36 and 37 cooperate to define an annular space 38 in the upper column in which air is trapped.

As explained above, both columns have flow passages therethrough, the flow passage in the lower column being defined by the inner surface of the wall 32 and the flow passage in the upper column being defined by the inner surface of the wall 35. Since the upper end of the column 22 is open, if the valve 14 does not shut tightly, water will overflow, pass through the flow passages of the columns 20 and 22 and be discharged from the tank through the discharge port.

The discharge port at the bottom of the tank 10 is fitted with a coupling 39 which connects the interior of the tank with the conduit 18. This coupling 39, as best shown in FIGURE 4, includes a tubular element 40 having exterior threads and upper and lower collars 41 and 42 threaded on the outside of the tubular element on opposite sides of the bottom wall of the tank and holding sealing gaskets 43 in place. The conduit 18 is formed, in part, by the passage through the tubular element 40.

The columns 20 and 22 each carry aligned slides 44 which are supported on the axis of the columns by radial ribs 45. These slides are guided on the vertical rod 24 which is supported at its lower end by a rod-supporting insert 46 within the tubular element 40. As best shown in FIGURE 7, the insert 46 includes an annular ring 47, a central hub 49 and radial ribs 50 connecting the ring and the hub. The ring 47 is fixed within the upper end of the tubular element 40 of the coupling 39, and the rod is threaded into the hub portion of the insert.

As best shown in FIGURE 4, the lower end of the outer wall 31 of the lower column 20 has a groove 51 formed therein which is of complementary shape with the upper end of the tubular element 40 of the coupling so as to interlock therewith and provide an effective seal therebetween. Also, the upper end of the column 20 has a circular rib 52 formed thereon which interlocks with a complementary groove 53 formed in the lower end of the column 22 to provide an effective seal therebetween.

An outwardly extending lip or flange 54 is formed around the upper end of the upper column 22, and an outwardly extending lip of flange 55 is formed around the upper end of the lower column 20. As best shown in FIGURE 5, the end of the arm 28 opposite the handle 26 is bifurcated, and the bifurcated ends 28a and 28b each have rounded ends 28c disposed on opposite sides of the column 22 beneath the flange 54. Also, as shown in FIGURE 6, the bifurcated ends 30a and 30b of the arm 30 have rounded ends 30c disposed on opposite sides beneath the flange 55 of the lower column 20.

The columns 20 and 22 are preferably made of plastic material, but other suitable relatively lightweight materials can also be used. The columns are each light enough so that they will be buoyed or substantially buoyed by the air entrapped within the air spaces 34 and 38 when lowered into the water after the respective column has been lifted in the tank. On the other hand, an effective seal will be provided between the upper and lower columns and between the lower column and the discharge port by the differential pressure acting on opposite sides of the wall 37 of the upper column 22. In this regard, when the upper column is properly seated on the lower column, the space 38 and the lower side of the wall 37 will be in communication with atmospheric pressure and the upper surface of the wall 37 will be in communication with water pressure, producing a net downward force on the upper column which in turn acts on the lower column to maintain an effective seal notwithstanding the lightweight material of which the columns are made.

The weight of the arms 28, 30 will ordinarily maintain the handle 26 in the position shown in FIG. 1. Partial rotation of the handle to the position shown in FIG. 2 brings the bifurcated ends of the arm 28 into engagement with the flange 54 of the upper column, unseating the upper column 22 for partial discharge of the tank through the lower column 20 and the discharge port, the lost motion spacing between the bifurcated ends of the arm 30 and the flange 55 of the lower column preventing the unseating of the lower column. Further rotation of the handle to the position shown in FIG. 3 also unseats the lower column for maximum discharge of the tank. When only the upper column is unseated and the handle is released, the upper column, buoyed by air entrapped within the space 38, will drop with the receding water until it is restored to sealing relationship with the lower column. When both columns are unseated, air entrapped within the space 34 of the lower column will produce the same result. In either case, when the float 16 drops to a predetermined level, it will open the valve 14 and admit water into the tank. As soon as the columns are seated, the water level will rise in the tank while sealing water continues to be admitted to the bowl through the conduit 29 and the flow passages through the columns. When the water reaches the desired level, the float-actuated valve will close and any excess water admitted into the tank will overflow through the columns to the discharge port.

It will be apparent that the quantities of water discharged will depend upon the size and shape of the tank 10 and the design of the columns 20 and 22. Where the columns are of equal height, the smaller quantity will be approximately one-half of the larger quantity. Other ratios can be obtained by changing the relative heights of the columns.

It will be understood by those skilled in the art that the above-described embodiment of the invention is susceptible of considerable modification and variation without departing from the scope and spirit of the invention. Therefore, the scope of the invention will not be deemed limited except by the following claims.

I claim:

1. A flush tank comprising means defining a discharge opening at the bottom thereof, lower and upper columns having flow passages therethrough, the lower column in its lowermost position being removably seated in sealing engagement on a surface surrounding the discharge opening and entrapping a quantity of water within the tank to the full height of the lower column, and the upper column in its lowermost position being removably seated in sealing engagement with the lower column and entrapping a quantity of water within the tank to the height of the two columns in end-to-end relation, actuating means outside the tank, and means operably coupling the actuating means to both of said columns, said actuating means being selectively operable to lift either the upper column to permit a discharge of water of the tank through the lower column and the discharge opening or to lift both columns to permit a maximum discharge of water from the tank.

2. A flush tank comprising means defining a discharge opening at the bottom thereof, lower and upper columns having flow passages therethrough, the lower column in its lowermost position engaging a surface surrounding the discharge opening and entrapping a quantity of water within the tank to the full height of the lower column, and the upper column in its lowermost position being in end-to-end sealing engagement with the lower column and entrapping a quantity of water within the tank to the height of the two columns in end-to-end relation, actuating means outside the tank, and means operatively coupling the actuating means to both of said columns, said actuating means being selectively operable to lift either the upper column to permit a discharge of water from the tank through the lower column and the discharge opening, or to lift both columns to permit a maximum discharge of the tank, means defining an air-entrapping chamber in each of said columns surrounding the flow passage to buoy the column when it is unseated, the chambers in each of said columns being open at the bottom and communicating with the water in the tank when the respective column is unseated and communicating with the tank discharge opening when the respective column is seated.

3. A flush tank as set forth in claim 2 wherein said means defining a chamber in each of said columns includes an inner annular wall extending substantially to the lower end of the column, the inner wall also defining the flow passage through the column, and an outer annular wall spaced from the inner wall, the outer wall including an annular sealing surface.

4. A flush tank comprising means defining a discharge opening at the bottom thereof, upper and lower columns each having a flow passage therethrough, the lower column in its lowermost position being removably seated in sealing engagement on a surface surrounding the discharge opening and thereby entrapping a quantity of water within the tank to the height of the lower column, and the upper column in its lowermost position being removably seated in end-to-end sealing engagement with the lower column and entrapping a quantity of water within the tank to the height of the two columns in end-to-end relation, means carried by each of said columns defining an air-entrapping chamber surrounding the flow passage, said chamber being open at the bottom and communicating with the discharge opening when the respective column is seated, and communicating with the water in the tank when the respective column is unseated, the air-entrapping chamber thereby buoying the column in the water after the column is unseated, guide means operatively coupled with the columns for guiding each of the columns for vertical movement within said tank to maintain the columns in alignment with the discharge opening and each other, and actuating means operatively coupled with the columns for selectively lifting either the upper column to unseat the upper column from the lower column to permit a discharge of water from the tank through the lower column and the discharge opening or for lifting both columns together to unseat the lower column from the surface surrounding the discharge opening to permit a greater discharge of water from the tank, the columns after being lifted being floatable by the water in the tank without direct connection with the actuating means so that the columns will float downwardly to their seated positions independently of the operation of the actuating means.

5. A flush tank as set forth in claim 3 wherein the air entrapping chamber of said upper column is defined in part by a top wall between the inner and outer walls, the upper surface of said top wall being in communication with the water when the column is seated and the tank filled so that the water pressure exerts downward seating force on both columns.

6. A flush tank comprising means defining a discharge opening at the bottom thereof, lower and upper vertically movable columns having flow passages therethrough communicating with said discharge opening, the lower column in its lowermost position removably seated in sealing engagement with the surface surrounding the discharge opening and entrapping a quantity of water within the tank to the full height of the lower column, and the upper column in its lowermost position being removably seated in end-to-end sealing engagement with the lower column and entrapping a quantity of water within the tank to the height of the two columns in end-to-end relation, actuating means operatively coupled with the columns to lift selectively either the upper column to permit a discharge of water from the tank through the lower column and the discharge opening to the height of the lower column, or to lift both columns to permit a maximum discharge of the tank, and means carried by each of said columns defining an air entrapping space outwardly of the flow passage of the column and open at the bottom and being in open communication with the discharge opening when the respective column is seated, the air entrapping space of the upper column buoying the upper column in the water when it is lifted up after actuation, and the air-entrapping space in the lower column buoying both the columns in the water when they are lifted up after actuation.

References Cited by the Examiner
UNITED STATES PATENTS

| | | | |
|---|---|---|---|
| 379,159 | 3/88 | Harkins | 4—56 |
| 978,914 | 12/10 | Madden | 4—59 |
| 1,767,043 | 6/30 | Blaun et al. | 4—37 |
| 2,206,235 | 7/40 | Powers | 4—57 |
| 2,944,265 | 7/60 | Carmichael | 4—206 |
| 3,005,206 | 10/61 | Dollinger | 4—57 |
| 3,080,567 | 3/63 | King | 4—57 |

EDWARD V. BENHAM, *Primary Examiner.*

LEWIS J. LENNY, *Examiner.*